United States Patent [19]

Schwartz et al.

[11] Patent Number: 5,676,740
[45] Date of Patent: Oct. 14, 1997

[54] MEANS FOR REMOVING GAS FROM A HYDRONIC SYSTEM

[75] Inventors: Marvin P. Schwartz, Wheeling; Chalard Bunluaphob, Glenview; Prasert Buranatum, Skokie, all of Ill.

[73] Assignee: ITT Fluid Technology Corporation, Midland Park, N.J.

[21] Appl. No.: 378,701

[22] Filed: Jan. 23, 1995

[51] Int. Cl.[6] .................................................. B01D 19/00
[52] U.S. Cl. ................................................ 96/204; 96/220
[58] Field of Search ............................ 96/155, 179, 186, 96/204, 219, 220; 95/262, 241

[56] References Cited

U.S. PATENT DOCUMENTS

| | | |
|---|---|---|
| 1,779,023 | 10/1930 | Waters . |
| 1,982,884 | 12/1934 | Schroder et al. . |
| 2,710,664 | 6/1955 | Blackmore et al. . |
| 2,838,131 | 6/1958 | Peterson . |
| 3,008,538 | 11/1961 | Glasgow . |
| 3,151,961 | 10/1964 | Blackmore et al. . |
| 3,854,906 | 12/1974 | Roffelsen . |
| 4,027,691 | 6/1977 | Roffelsen . |
| 4,062,661 | 12/1977 | Wiemer et al. ........................ 55/190 |
| 4,229,386 | 10/1980 | Lerner . |
| 4,381,928 | 5/1983 | Roffelsen . |
| 4,456,172 | 6/1984 | Roffelsen . |
| 4,555,253 | 11/1985 | Hull et al. . |
| 4,645,518 | 2/1987 | Roffelsen . |
| 4,718,922 | 1/1988 | Roffelsen . |
| 4,787,920 | 11/1988 | Richard . |
| 4,919,802 | 4/1990 | Katsura . |
| 4,993,599 | 2/1991 | Gruenewald . |
| 5,490,874 | 2/1996 | Kuster et al. ......................... 96/204 |

FOREIGN PATENT DOCUMENTS 4633670  5/1968  Japan .

*Primary Examiner*—David W. Wu
*Attorney, Agent, or Firm*—Menotti J. Lombardi

[57] ABSTRACT

A compact set of circular, wire-formed brushes, within a housing, provides the surfacing upon which, and in which, air bubbles can coalesce for subsequent venting thereof from the housing, and the housing has porting formed therein to accommodate a through-flow of an aqueous solution, of a hydronic system or the like. A sleeve-type diffuser, having a multiplicity of holes formed therein, encloses and supports the set of brushes, and diffuses and distributes the housing-admitted liquid or vapor.

18 Claims, 2 Drawing Sheets

MEANS FOR REMOVING GAS FROM A HYDRONIC SYSTEM

BACKGROUND OF THE INVENTION

There are in the prior art devices for removing gas from hydronic systems which have circulating aqueous solutions, used for environmental heating or cooling. Typically, these devices rely on surfacing of an expansive area for gas, i.e., air bubbles, which travel with the hydronic solutions, to collect, grow in size, and subsequently be vented from the system. Exemplary thereof, perhaps, is the Mass or Heat Transfer or Separation of Solid or Immiscible Components from Fluids, disclosed in U.S. Pat. No. 4,229,386, issued on 31 Oct. 1980 to Bernard J. Lerner.

The prior art gas removing devices have shortcomings, such as: poor air removal efficiency at high liquid flow rates. The configurations thereof are such as prohibit their being mounted in place of an elbow (ninety degrees of arc) pipe fitting. The air venting means thereof is non-removable and, consequently, upon such air venting means failing, the entire device must be replaced. More, they are not constructed to accommodate conventional compression tanks, in order to be able to absorb liquid thermal expansion.

SUMMARY OF THE INVENTION

It is an object of this invention to set forth an improved means for removing gas from a hydronic system, or the like, which avoids all of the aforesaid shortcomings. Specifically, it is an object of this invention to set forth means for removing gas from a hydronic system, or the like, comprising a housing; porting means, formed in said housing, for admitting liquid into, and for discharging such from, said housing; means confined within said housing for collecting and coalescing gas therein; and means within said housing for diffusing housing-admitted liquid; and wherein said porting means further comprises means for venting gas from said housing.

Further objects of this invention, as well as the novel features thereof, will become apparent by reference to the following description, taken in conjunction with the accompanying figures.

DESCRIPTION OF THE PREFERRED EMBODIMENT

Figure 1:
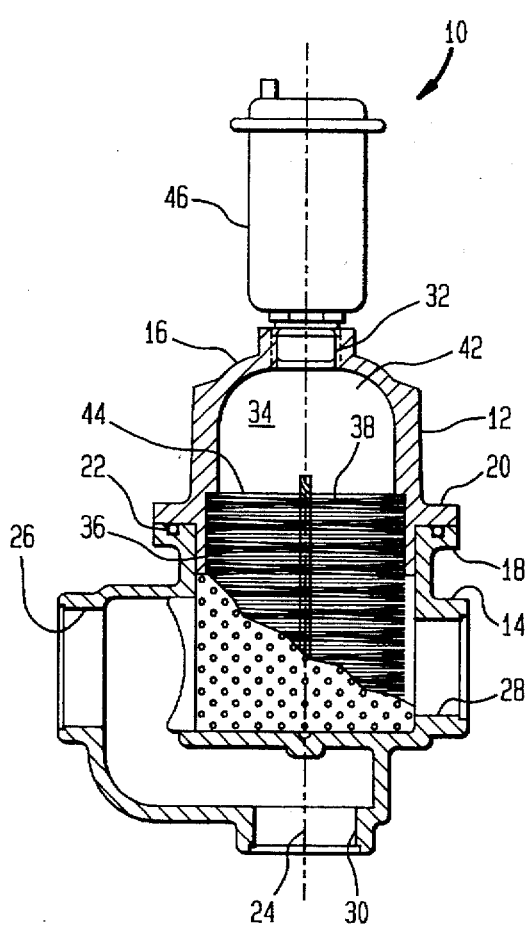
FIG. 1 is a generally axial cross-sectional view of the novel gas removing means, according to an embodiment thereof.
Figure 2:
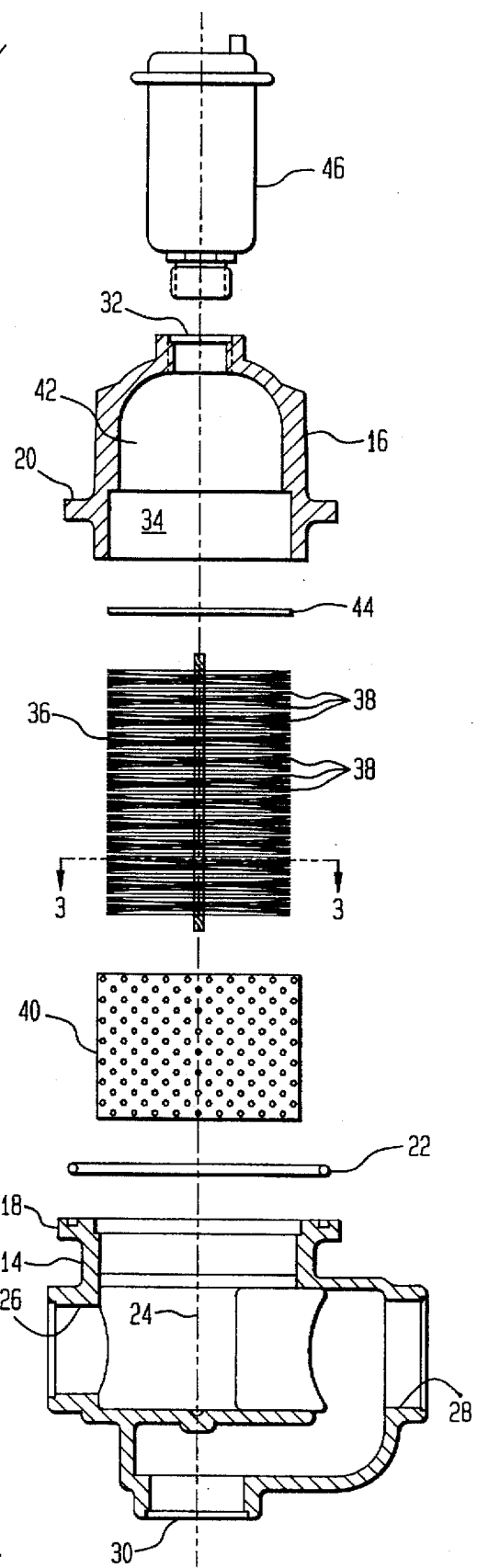
FIG. 2 is an exploded view of the embodiment of FIG. 1 which, however, is rotated one hundred and eighty degrees of arc about the axis.

As shown in FIGS. 1 and 2, the inventive gas removing means 10 comprises a housing 12 having a body 14 and a cap 16. Said body 14 and cap 16 have mutually-engaging threading and commonly confronting flanges 18 and 20. Flange 18 is annularly grooved to receive an O-ring seal 22 therein. The housing 12 has a longitudinal axis 24 and a pair of radial ports 26 and 28, as well as a pair of axial ports 30 and 32. Ports 26, 28 and 30 provide for the admission and/or discharge of hydronic system liquid into and out of the housing 12, whereas port 32 is provided for the venting therethrough of such gas as means 10 removes from the associated hydronic system (not shown).

The housing 12 defines therewithin a cylindrical cavity or void 34 in which a means for collecting gas therein is confined. The gas collecting means comprises a plurality of brushes 38 formed of wire, wherein the brushes 38 are assembled in close unity to form a circular compact set 36. A cylindrical sleeve 40, having a multiplicity of hole (foramen) formed therein, encloses the brushes set 36 and supports the set as well. The sleeve 40 comprises a diffuser; it diffuses and distributes the housing-admitted liquid, giving the means 10 a superior performance.

Figure 4:
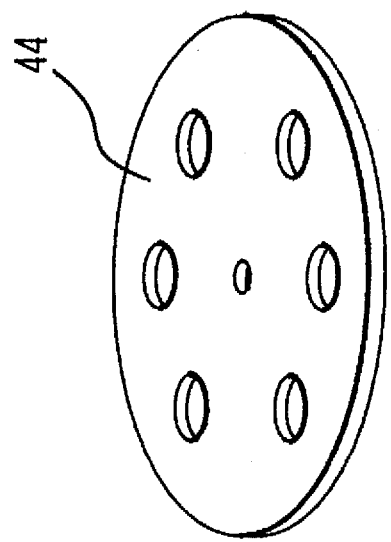
FIG. 4 is a perspective view of the gas-isolating plate.
Figure 3:
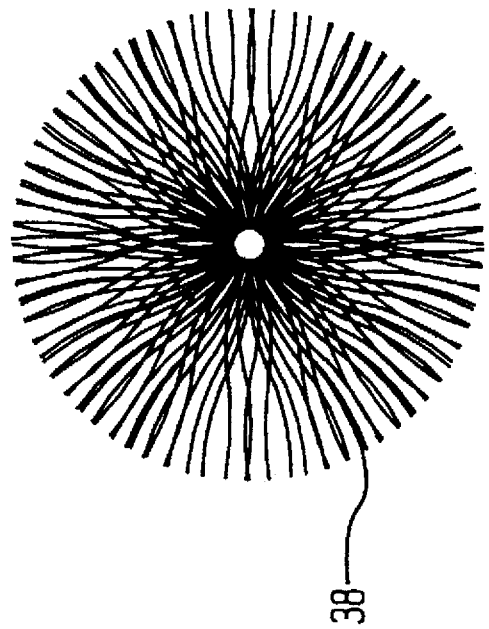
FIG. 3 is a cross-sectional view of the compact set of brushes, as taken along section 3—3 of FIG. 2.

An uppermost portion of the cavity or void 34 comprises a holding chamber 42 in which separated or removed gas is retained prior to venting thereof from the means 10. Set upon the uppermost end of the brushes 38 is an apertured plate 44, the same shown in FIG. 4 in perspective. Plate 44 keeps that gas which has been separated or removed from the through-housing liquid from re-entering the liquid; it isolates the gas from the liquid.

Removably threaded into the port 32 is an automatic air vent device 46, the same comprising a No. 87 Automatic Air Vent, as marketed by ITT Bell & Gossett of Morton Grove, Ill., or similar device.

Port 32 can be used, optionally, for attachment thereat of a compression type tank for limiting the hydronic system liquid pressure as the system temperature is increased. Too, axial port 30 can also be used to attach thereat a diaphragm or bladder type expansion tank to the associated hydronic system.

Our novel introduction of the diffuser-sleeve 40 provides for efficient gas removal at significantly higher liquid flow rates. Too, the ports 26, 28 and 30 accommodate for the employment of the novel gas removing means 10 either inline or in place of a ninety degree of arc pipe elbow. As noted, in that the air vent device 46 is separable from the housing 12, only it needs to be replaced should it require servicing, and it can be removed to permit the aforenoted attachment of a compression type tank for dealing with system liquid pressure and temperature.

While we have described our invention in connection with a specific embodiment thereof it is to be clearly understood that this is done only by way of example, and not as a limitation to the scope of the invention as set forth in the objects thereof and in the appended claims.

We claim:

1. Means for removing gas from a hydronic system, comprising:

a housing;

porting means, formed in said housing, for admitting liquid into, and for discharging such from said housing;

means confined within said housing for collecting and coalescing gas therein; and means within said housing for diffusing housing-admitted liquid; and wherein said porting means further comprises means for venting gas from said housing.

2. Gas removing means, according to claim 1, wherein:

said housing has an axis; and said porting means comprises a plurality of radial ports, and a plurality of axial ports.

3. Gas removing means, according to claim 1, wherein:

said gas collecting means comprises a bristled coalescing element.

4. Gas removing means, according to claim 3, wherein:

said diffusing means encloses said element therewithin, and supports said element.

5. Gas removing means, according to claim 1, wherein:

said housing has a cylindrical chamber formed therewithin; and said diffusing means comprises a cylindrical, foraminous component.

6. Gas removing means, according to claim 3, wherein:

said element comprises a compact set of circular, wire-formed brushes.

7. Gas removing means, according to claim 1, further including:

means interposed between said collecting means and said venting means for isolating gas from housing-admitted liquid.

8. Gas removing means, according to claim 7, wherein:

said gas isolating means comprises an apertured plate.

9. Gas removing means, according to claim 1, wherein:

said housing has (a) a body, and (b) a cap; and said venting means comprises a port formed in said cap.

10. Gas removing means, according to claim 9, further including:

an automatic air venting device removably coupled to said port.

11. An air separator for removing gas from a hydronic system, comprising:

a housing defining a chamber, the housing having an input port for admitting liquid into the chamber and an output port for discharging liquid from the chamber;

a venting port carried by the housing for venting gas from the chamber;

a bristled coalescing element carded in the chamber of the housing for collecting and coalescing gas therein; and diffusing means within said housing for diffusing housing-admitted liquid.

12. An air separator for removing gas from a hydronic system as in claim 11, wherein, the diffusing means encloses the bristled coalescing element there within, and supports the element.

13. An air separator for removing gas from a hydronic system as in claim 12, wherein, the chamber is cylindrical and the diffusing means is a cylindrical sleeve having a multiplicity of holes formed therein.

14. An air separator for removing gas from a hydronic system as in claim 13, further comprising an apertured plate between the bristled coalescing element and the venting port for isolating gas from the liquid in the chamber.

15. An air separator for removing gas from a hydronic system, comprising:

a housing defining a generally cylindrical chamber, the housing defining a longitudinal axis extending through the chamber;

the housing having a radial input port and an axial input port for admitting liquid into the chamber, the axial input port located along the longitudinal axis and in communication with the radial input port, a radial output port for discharging liquid from the chamber, and an axial venting port for venting gas from the chamber;

a plurality of brushes formed of wire extending generally radially from the longitudinal axis and assembled in a close unity to form a circular compact coalescing element carried in the chamber of the housing for collecting and coalescing gas therein; and diffusing means within said housing for diffusing housing-admitted liquid.

16. An air separator for removing gas from a hydronic system as in claim 15, further comprising an apertured plate between the bristled coalescing element and the venting cylindrical sleeve which encloses the bristled coalescing element therewithin, and supports the element, the cylindrical sleeve having a multiplicity of holes formed therein.

17. An air separator for removing gas from a hydronic system as in claim 16, wherein the housing has a body and a cap, and the venting port is carried by the cap.

18. An air separator for removing gas from a hydronic system, comprising:

a housing defining a generally cylindrical chamber, the housing having an input port for admitting liquid into the chamber, an output port for discharging liquid from the chamber, a venting port for venting gas from the chamber;

a plurality of brushes formed of wire assembled in a close unity to form a circular compact coalescing element carried in the chamber of the housing for collecting and coalescing gas therein;

a cylindrical sleeve which encloses the bristled coalescing element therewithin, and supports the element, the cylindrical sleeve having a multiplicity of holes formed therein; and an apertured plate between the bristled coalescing element and the venting port for isolating gas from the liquid in the chamber.

\* \* \* \* \*